United States Patent
Needham et al.

(10) Patent No.: US 7,152,174 B2
(45) Date of Patent: Dec. 19, 2006

(54) METHOD AND APPARATUS FOR OPERATING A SERVER SYSTEM INCLUDING DETERMINING THE POWER SUPPLIED BY ONE OF A PLURALITY OF POWER SUPPLIES BY MEASURING VOLTAGE ON A LOAD SHARE SIGNAL LINE

(75) Inventors: David B. Needham, The Woodlands, TX (US); Gary L. Becker, Sugar Land, TX (US); James R. Rodgers, Jr., Magnolia, TX (US); Jun Lin, Tomball, TX (US)

(73) Assignee: Hewlett-Packard Development Company, LP., Houston, TX (US)

( * ) Notice: Subject to any disclaimer, the term of this patent is extended or adjusted under 35 U.S.C. 154(b) by 636 days.

(21) Appl. No.: 10/382,456

(22) Filed: Mar. 6, 2003

(65) Prior Publication Data

US 2004/0174642 A1 Sep. 9, 2004

(51) Int. Cl.
*G06F 1/28* (2006.01)
*G06F 1/30* (2006.01)
(52) U.S. Cl. .................................... 713/340; 713/300
(58) Field of Classification Search .................. None
See application file for complete search history.

(56) References Cited

U.S. PATENT DOCUMENTS

| | | | | |
|---|---|---|---|---|
| 5,842,027 A | * | 11/1998 | Oprescu et al. | 713/300 |
| 6,144,115 A | * | 11/2000 | Massie et al. | 307/80 |
| 6,385,024 B1 | * | 5/2002 | Olson | 361/87 |
| 6,396,169 B1 | * | 5/2002 | Voegeli et al. | 307/52 |
| 6,594,771 B1 | * | 7/2003 | Koerber et al. | 713/330 |
| 6,768,295 B1 | * | 7/2004 | Santin et al. | 324/76.79 |
| 6,785,142 B1 | * | 8/2004 | Regimbal et al. | 361/727 |
| 6,785,827 B1 | * | 8/2004 | Layton et al. | 713/300 |
| 2004/0148060 A1 | * | 7/2004 | Lee | 700/295 |

OTHER PUBLICATIONS

J. A. Santin et al., "Offset Calibration Of Current Sharing Signal For Power Supply Units In Redundant Operation," U.S. Appl. No. 10/158,336, filed May 30, 2002 (28 p.).

* cited by examiner

*Primary Examiner*—Lynne H. Browne
*Assistant Examiner*—Anand B. Patel

(57) ABSTRACT

The specification may disclose a system and related method for control of a server system that may include determining the amount of power delivered in a system utilizing redundant power supplies based on a measurement of the voltage of load share signals between those power supplies, and then allowing additional servers installed in the server system to power-on only if the amount of power required for the combined servers does not exceed the maximum available power or exceed the power required for a certain type of redundant power supply operation.

20 Claims, 4 Drawing Sheets

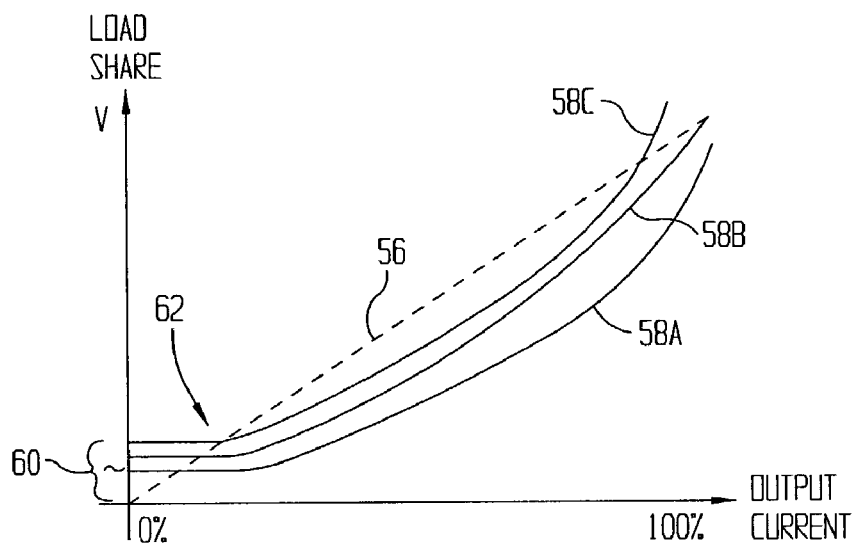
FIG 4
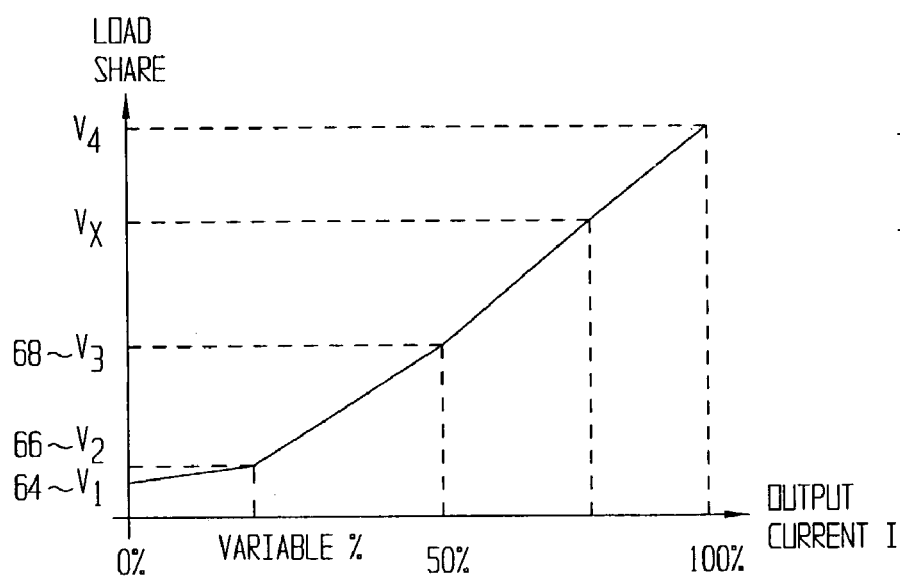
FIG 5
| I% | $V_{LS}$ |
|---|---|
| 0% | $V_1$ |
| VAR% | $V_2$ |
| 50% | $V_3$ |
| 100% | $V_4$ |
FIG 6

METHOD AND APPARATUS FOR OPERATING A SERVER SYSTEM INCLUDING DETERMINING THE POWER SUPPLIED BY ONE OF A PLURALITY OF POWER SUPPLIES BY MEASURING VOLTAGE ON A LOAD SHARE SIGNAL LINE

BACKGROUND

Server systems may be mounted in racks or enclosures, each rack holding a plurality of individual servers or blades. A server may be relatively powerful computer, which may comprise multiple microprocessors, that may be adapted for coupling together multiple personal computers and provide remote processing functionality. Servers may be used for mission-critical services such as on-line banking, on-line shopping and the like, and each rack of servers may have multiple power supplies, these power supplies may create a fully redundant power supply system. A fully redundant power supply system may have two or more power supplies, any one of which may be capable of supplying power for the entire rack of servers. Thus, if one power supply fails, the remaining power supply or power supplies may have the capability of supplying the necessary power while the failed power supply is replaced.

To balance load, each power supply in a redundant configuration may have a load share signal that may couple to a load sharing line coupled between power supplies. Each power supply may be designed and configured to drive the line to a voltage proportional to its output current (power). Each power supply may monitor the load sharing line and attempt to raise or lower its output current to match the voltage on the load share line. In this way, the load may be shared between the two or more power supplies.

However, there may be a need to verify that sufficient power is available, or redundancy of supplied power may be maintained, prior to allowing an additional device, such as a server, installed in the rack to power-on.

BRIEF DESCRIPTION OF THE DRAWINGS

For a detailed description of the embodiments of the invention, reference will now be made to the accompanying drawings in which:

FIG. 4 illustrates some possible load share voltage to output current relationships for power supplies in accordance with embodiments of the present invention;

FIG. 5 illustrates one possible model for the relationships of the load share voltage to the output current of some power supply in accordance with embodiments of the present invention;

FIG. 6 illustrates, in table form, the model exemplified in FIG. 5 in accordance with embodiments of the present invention.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The term "rack of servers" may be equivalent to "rack of enclosures with servers."

DETAILED DESCRIPTION

Figure 1:
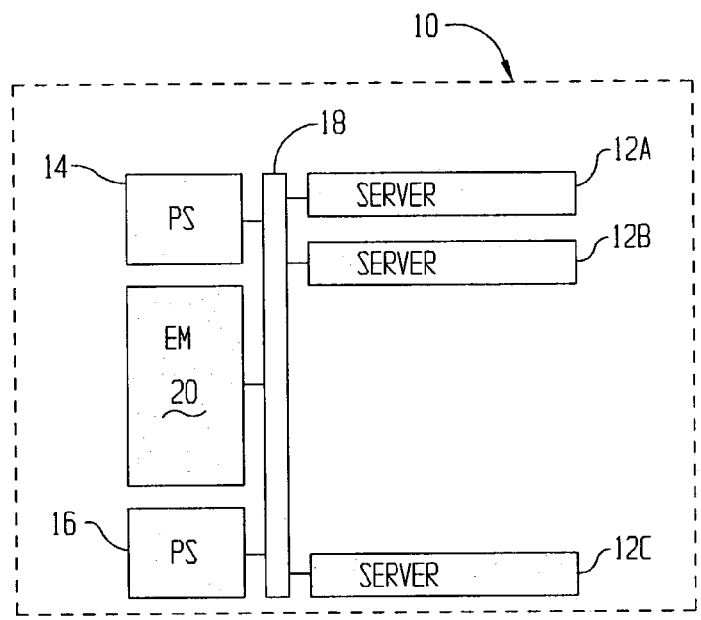
FIG. 1 illustrates a rack or enclosure/server system in accordance with embodiments of the invention.

FIG. 1 illustrates a schematic view of a single rack or enclosure 10 in accordance with embodiments of the present invention. The enclosure 10 may comprise a plurality of servers 12. The servers may draw power from power supplies 14 and 16. The power supplies 14, 16 may have sufficient power output capability that the enclosure 10 may operate in a fully redundant mode. If either power supply 14, 16 fails, the remaining operational power supply may be capable of supplying power to the enclosure 10. The power supplies 14, 16 may couple their power to the servers 12 by way of a mid-plane board 18. The enclosure 10 may further comprise an enclosure manager 20 which may couple to the power supplies 14, 16 as well as the servers 12 by way of the mid-plane board 18. The enclosure manager 20 may perform various functions, such as controlling fans in the enclosure (not shown) and facilitating external communications. Also, the enclosure manager 20 may be responsible for determining an amount of power delivered by the power supplies 14, 16, and thereafter determining whether an additional device, such as a server, installed into the enclosure 10 may be powered-on without adversely overloading the power supplies or affecting the fully redundant power supply operations.

Figure 2:
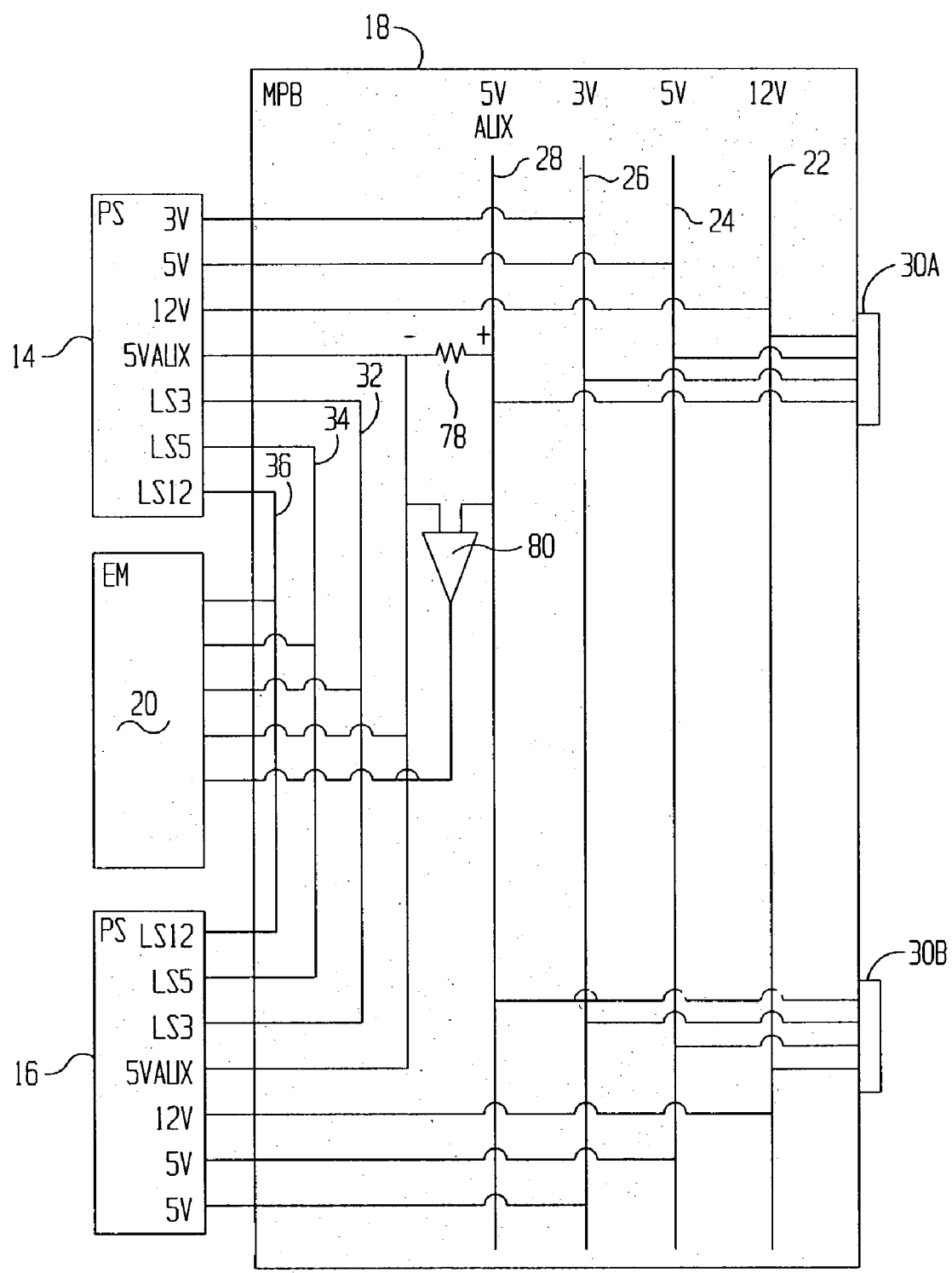
FIG. 2 illustrates power supply and enclosure manager interconnectivity using a mid-plane board in accordance with embodiments of the present invention.

FIG. 2 illustrates an interconnection of the power supplies 14, 16, enclosure manager 20, and mid-plane board 18 with regard to power distribution. The mid-plane board may comprise multiple power rails, such as: a 12 volt rail 22, a 5 volt rail 24, a 3 volt rail 26, and a 5 volt auxiliary rail 28. As the drawing of FIG. 2 illustrates, each connector, for example 30A, 30B, to which a server or other device (not shown in FIG. 2) may be coupled, may itself be coupled to each of the power rails 22, 24, 26 and 28. In operation, servers coupled to the connectors 30 may draw power as necessary from the appropriate rail.

Power supplies 14, 16 likewise may couple to the power rails and supply power to those rails. More particularly, power supply 14 may have a 3 volt power output signal, a 5 volt power output signal, a 12 volt power output signal, and a 5 volt auxiliary output power signal. Correspondingly, power supply 16 may have the same 3 volt, 5 volt, 12 volt and 5 volt auxiliary power output signals. With regard to the 3 volt, 5 volt and 12 volt power output signals, each power supply 14, 16 may couple to each power supply rail 22, 24, 26 and 28 to facilitate the ability of each power supply to provide power during normal operations, and which may comprise the entire required power given a power supply failure. The power supplies 14, 16 may also be coupled by way of the load sharing signals.

Still referring to FIG. 2, the mid-plane board 18 may comprise three traces 32, 34, 36 that may couple the 3 volt load sharing signal, 5 volt load sharing signal and 12 volt load sharing signal respectively of each of the power supplies 14, 16. By simultaneously monitoring and driving the load sharing signals, the power supplies 14, 16 may balance the amount of load provided by each power supply. Each power supply may be designed to drive a particular voltage on to each load sharing line proportional to the amount of output current being provided by the power supply on that output power rail. Since the voltage on each power rail may be constant, an indication of output current may be directly related to the power supplied to the rail. As between two or more power supplies, however, the power supply providing the most output current may drive the load sharing line to its higher voltage. In other words, as between two power supplies not providing the same amount of power, the load sharing line may have a voltage representing the larger of the supplied powers. Each power supply may monitor the load sharing signal, and attempt to adjust its output power to evenly distribute power delivery between the power supplies.

Embodiments of the present invention may utilize the load sharing signals in a steady-state condition to determine the power delivered. Using the power delivered, the embodiments of the present invention may selectively allow or disallow an additional device installed in the enclosure 10 to power-on. If power requirements of the additional device force the enclosure 10 to operate in other than a fully redundant condition with respect to available power, the enclosure manager 20 may not allow the additional device to power-on. That is, if the power delivered plus the power required for the additional device exceed a rated power capacity for either of the power supplies (in a two power supply embodiment), the additional device is not allowed to power-on. In this event, the enclosure manager may alarm, or otherwise give notice, of the reason for the device's failure to power-on. For the enclosure manager 20 to make this determination, it may be necessary for the enclosure manager 20 to determine the total power provided. This determination may be made by monitoring and analysis of the load share lines 32, 34 and 36, and the power provided across the 5 volt auxiliary line.

Still referring to FIG. 2, the enclosure manager 20 may determine the total power drawn by the enclosure 10. With regard to the 3 volt, 5 volt and 12 volt power output signals of the power supplies 14, 16, the total power may be determined based on the voltage levels present on the load share lines 32, 34 and 36 respectively. Further, each server installed in the enclosure 10 may draw power from the 5 volt auxiliary rail 28, and thus the enclosure manager 20 may also monitor the total power draw on this rail as part of the determination if the additional server may be allowed to power on.

Figure 3:
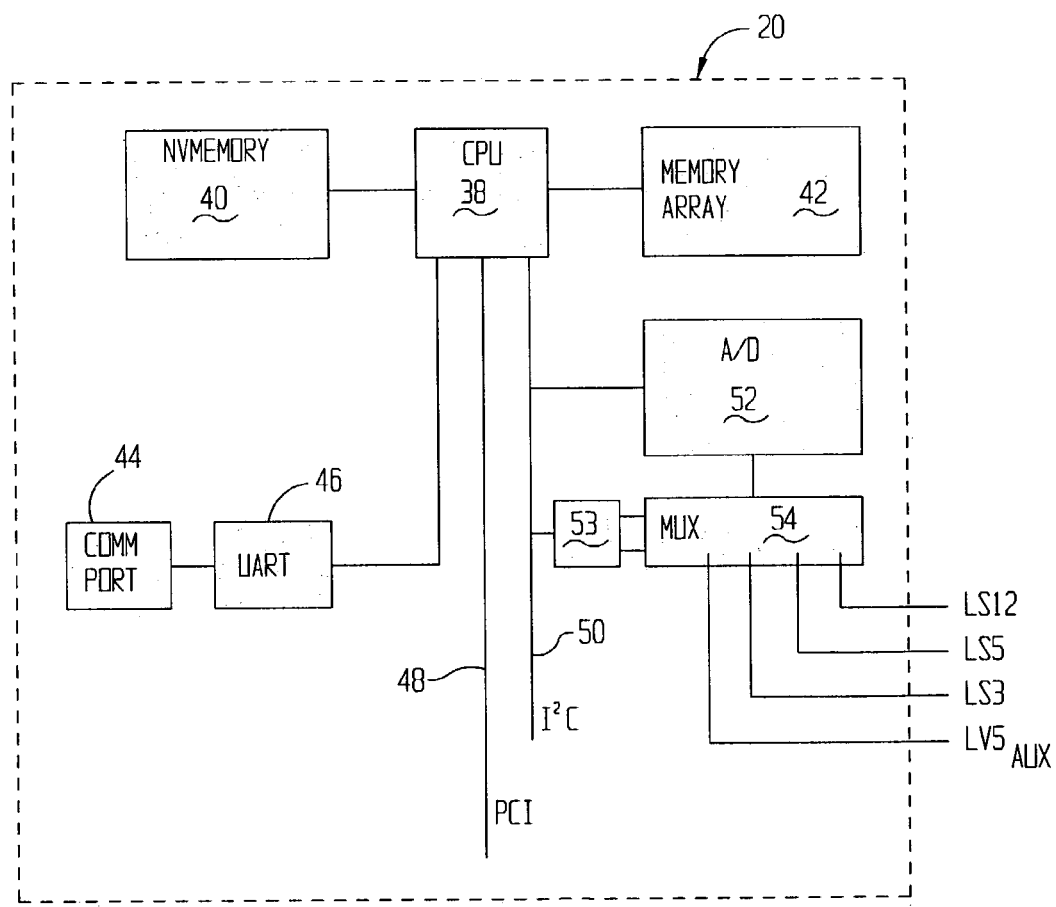
FIG. 3 illustrates a block diagram an enclosure manager in accordance with embodiments of the present invention.

FIG. 3 illustrates a block diagram of the internal components of the enclosure manager 20 of embodiments of the present invention. The enclosure manager 20 may comprise a central processing unit (CPU) 38. While any microprocessor or microcontroller may be used in the capacity of the CPU 38 of the enclosure manager 20, CPU 38 may be an IBM Power PC405GP. The CPU 38 may couple to a non-volatile memory 40. While many types of nonvolatile memory may be utilized without departing from the scope and spirit of the disclosure, the non-volatile memory 40 may comprise both flash read-only memory (FLASHROM) and non-volatile random access memory (NVRAM).

The CPU 38 of the enclosure manager 20 may also couple to a main memory array 42. The main memory array 42 may be synchronous dynamic random access memory (SDRAM), with the SDRAM 42 possibly being the working memory for the CPU 38. By contrast, the non-volatile memory 40 or other memory may store boot-strap programs for the CPU 38, as well as the software that may be necessary to implement the functions of the enclosure manager 20. As mentioned briefly above, the enclosure manager 20 may also facilitate external communications by way of a communication port 44 and universal asynchronous receiver transmitter (UART) 46 coupled to the CPU 38. The CPU 38 may also comprise communication buses such as a peripheral components interconnect (PCI) bus 48, and an I$^2$C bus 50. The I$^2$C bus 50, though shown with only a single line in FIG. 3 as well as FIG. 7, may be a dual line, multi-drop serial bus developed by Phillips Semiconductor that may comprise a clock line and one data line. Devices connected to the I$^2$C bus may act as either primary or secondary devices, and each device may be software addressable by a unique address. Primary devices may operate as transmitters, receivers, or a combination transmitter/receiver to initiate eight-bit data transfers between the devices on the bus. The I$^2$C bus may utilize collision detection and arbitration to prevent data corruption if two or more primaries simultaneously transfer data. Details regarding the I$^2$C bus may be found in the "The I$^2$C Bus Specification," Version 2.1 (January 2000), authored by Phillips Semiconductor.

To calculate a total instantaneous power being provided by the power supplies 14, 16, utilizing the load share signals 32, 34 and 36, the enclosure manager 20 may read the voltage levels on each of the load share signal lines. Reading the load share signal lines of the embodiments may involve the use of an analog to digital converter 52 that may be coupled on its input side to a multiplexer 54, and that may be coupled on its output side to the I$^2$C bus 50. A 12 bit analog to digital conversion may provide sufficient accuracy, thus, the analog to digital converter 52 may be a Texas Instruments Part No. ADS7823. As implied by the discussion of the exemplary drawing of FIG. 2, however, there may be four signals which need to be converted by the analog to digital converter 52, and thus multiplexer 54 may be responsible for selectively coupling each of these signals to the analog to digital converter. Multiplexer 54 may be a Fairchild 74VHC4052. Using the multiplexer 54 and analog to digital converter 52, enclosure manager 20 may sample the load share signals, as well as the 5 volt auxiliary power (discussed more fully below) to determine a total power delivered by the power supplies.

The load share signals coupled between the power supplies may be primarily designed for balancing supplied power. FIG. 4 illustrates a graph of voltage on a load share line (on the ordinate) against output current of a power supply (on the abscissa). The relationship between the load share voltage and the output current may be a straight line, such as dashed line 56. However, rarely do load share voltage values exhibit the straight line relationship. FIG. 4 further illustrates three exemplary curves 58 that may more accurately describe the relationship between a voltage produced on a load share line and output current for a particular voltage rail of a power supply. The family of curves 58A–C may exemplify that for three different power supplies of the same type, for example, three different relationships may exist. In order to accurately determine total power delivery by monitoring the load share voltage signals, the enclosure manager 20 may have the ability to compensate for the non-straight-line relationships. The relationship may comprise an offset 60, and a break point 62. Between the offset at the zero percent load share voltage and the break point 62, the relationship may generally be a straight line having no or a slight upward slope. Between the break point 62 and the 100% load share voltage, the relationship may be generally parabolic.

In at least some of the embodiments of the invention, the relationship for each load share signal voltage to output current (for each output power rail) may be modeled so that the enclosure manager may determine the relationship between the load share voltage signal and the current output. FIG. 5 illustrates one possible modeling strategy. The relationship between the load share voltage and the output current for each power rail of each power supply may be modeled using four points along the line, and therefore three segments. The modeling system exemplified in FIG. 5 may be equivalently represented in the table of FIG. 6. In the exemplary graph of FIG. 5 and the exemplary table of FIG. 6, the offset that the load share voltage maintains when the power output current reaches zero percent may be represented by voltage $V_1$ 64. The third point in the table of FIG. 6 may be the 50% output current (and therefore output power) mark, having a load share voltage $V_3$ 68. With respect to the 100% output current point, the exemplary table of FIG. 6 may likewise contain a load share voltage value $V_4$. In at least some of the embodiments of the present invention, the zero percent, 50% and 100% table (or graph) entries may be fixed. The location on the output current axis of the second table entry, however, may be variable from table to table. This entry may be defined by the break point. The break point may be the point in the load share voltage to output current relationship where the load share voltage changes appreciably with changes in output current. For example point 62 in the family of curves 58 of FIG. 4 and a corresponding load share voltage $V_2$ 66 may exemplify a break point. Thus, as any particular load sharing voltage to output current relationship may exhibit a different breakpoint, this may be accounted for in the variable table entry.

Figure 7:
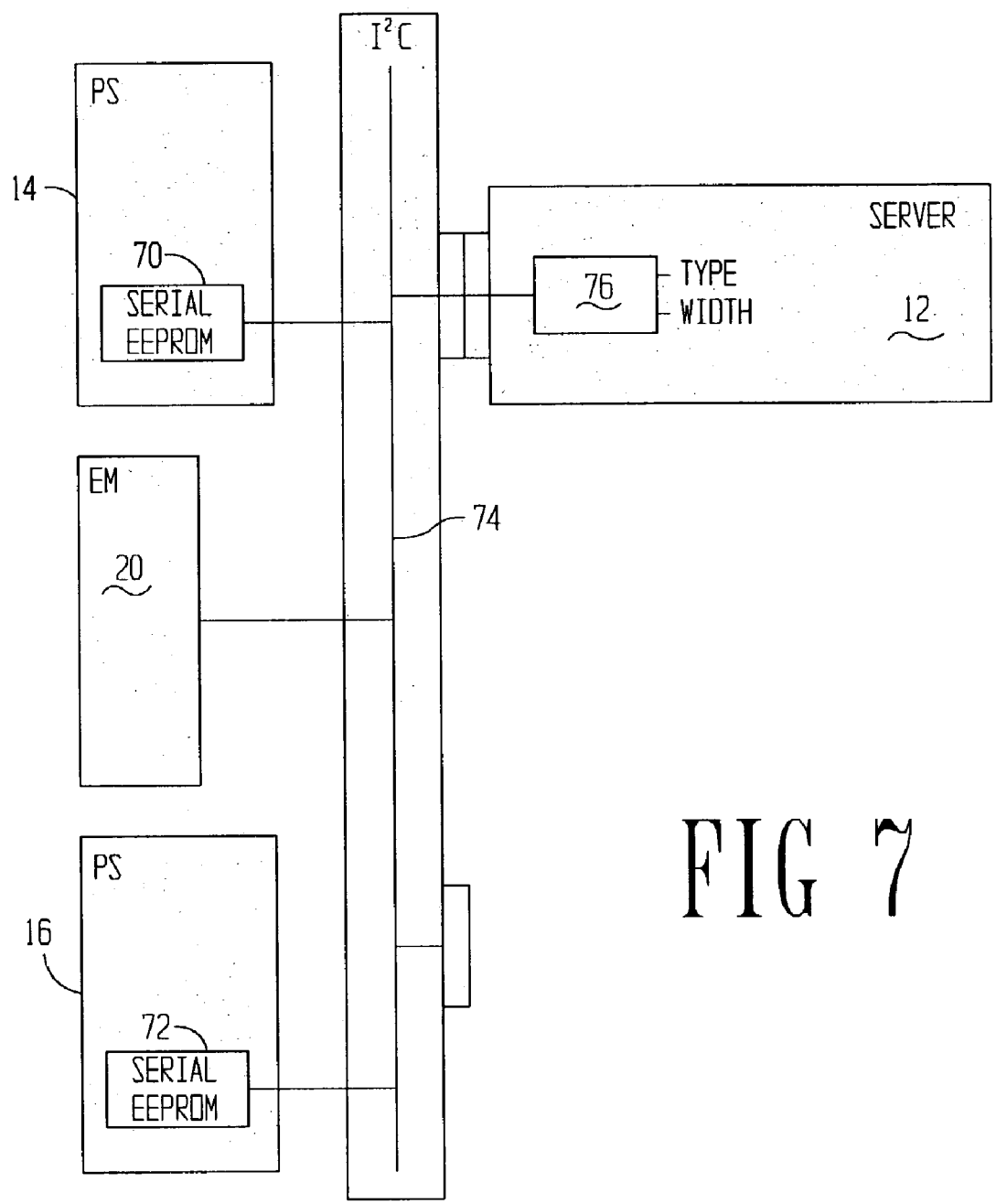
FIG. 7 illustrates an interconnectivity solution for serial communication in accordance with embodiments of the present invention.

Each power supply inserted into the enclosure 10 may have three main power output signals, and correspondingly three load share signals. Each of these load share signals may exhibit different characteristics, such as those shown for lines 58 of FIG. 4. Thus, in at least some embodiments, the enclosure manager 20 may need access to a data table, such as that exemplified in FIG. 6, that may model the relationship between the output current and the load share voltage for each of the power output signals for the particular power supply. The tables may be stored in serial electrically erasable programmable read only memory (EEPROM), for example serial EEPROM 70 of power supply 14 and serial EEPROM 72 of power supply 16 (FIG. 7). The enclosure manager 20 may read the various tables for the power supplies 14, 16 from their EEPROM 70, 72 respectively just after the power supplies 14, 16 and enclosure manager 20 are powered on; however, the enclosure manager 20 may also read this information at any time. The enclosure manager 20 may read three such tables from the EEPROM 70 of the power supply 14 over the I²C bus 74 (one for each power output rail except 5 volt auxiliary). Likewise, the enclosure manager 20 may read three tables from the EEPROM 72 of the power supply 16 across the I²C bus. Thereafter, the tables may be available to the enclosure manager for calculating total power provided by the two power supply devices, for example when an additional server is installed in the enclosure.

The servers 12, or other installed devices, of the embodiments of the present invention may not necessarily power-on automatically upon being inserted into the enclosure 10. Once the enclosure manager 20 becomes aware that an additional server has been installed, possibly by establishing communication across the I²C bus 74, the enclosure manager may read information about the installed or additional server or device. Servers of the embodiments of this invention may comprise an I²C general purpose I/O (GPIO) expander, such as GPIO expander 76. Devices such as expander 76 may allow transfer of bits of information both to and from the enclosure manager 20. After installation of an additional server, such as server 12 of FIG. 7, the enclosure manager 20 may read information regarding the type of server installed. Based on the type of server installed, the enclosure manager may determine the amount of power the server requires during normal operation. Prior to power-on of the additional server, the enclosure manager 20 may read the various load share signal lines, and may calculate the amount of power currently being provided to determine whether the additional server will adversely affect the fully redundant power supply operation.

Consider for purposes of explanation enclosure manager 20 reading and calculating the amount of power delivered from the power supplies 14, 16 on the 12 volt power rail 22. The enclosure manager 20 may read a voltage on the 12 volt load share line 36 by appropriately adjusting the multiplexer 54 to couple the load share voltage to the analog to digital converter 52. The selected control of the multiplexer 54 may be accomplished by an I²C GPIO expander 53 having its serial side coupled to the I²C bus 50, and in at least some embodiments, two of its digital outputs couple to the select lines of the multiplexer 54. Thus, the CPU 38 may communicate with the device 53 and select any of the input signals. Once the appropriate multiplexer 54 input is selected, the analog to digital converter may convert the analog signal to a digital value, which may be read by the CPU 38 over the I²C bus 50. Although possible, it is unlikely that the load share voltage value read by the CPU falls precisely on a value contained in the appropriate table. In this case, the CPU 38 may interpolate between values in an appropriate table.

Referring to FIG. 5, consider an exemplary load share voltage read by the CPU 38 of $V_x$. The voltage $V_x$ falls between the 50% output current entry and the 100% output current entry. The enclosure manager 20 may therefore utilize the data values of the 50% and 100% output current entries to determine the parameters which may be used to interpolate the output current (and therefore the output power) being generated for the particular power supply. After performing the lookup (and possible interpolation) for the first power supply, the enclosure manager may perform the same task for the second power supply. Each of these operations yields an output current for each power supply, and the enclosure manager may combine the results to determine the total output power for that particular power rail. The enclosure manager 20 may perform this same task for the additional power rails by reading the appropriate load share voltage signals.

Each server in the enclosure 10 may draw power from the 5 volt auxiliary power rail 28, and this too may be considered in determining total output power. Unlike the 12 volt, 5 volt and 3 volt power rails (22, 24 and 26 respectively), power supplies 14, 16 may not have a load share signal for the 5 volt auxiliary power. Thus, it may not be possible to determine the power by reading the load share signal.

Referring again to the exemplary FIG. 2, there is shown a sense resistor 78 coupled between the 5 volt auxiliary rail 58 and each of the power supplies 14, 16. The sense resistor 78 may be a very small, high-precision resistor used to measure the total current supplied to the 5 volt auxiliary rail 28. The enclosure manager 20 may read both the positive and negative sides of the resistor 78 and generate a voltage proportional to the current flow. The mid-plane board 18 may comprise an op-amp 80 having one input coupled on the negative side of the resistor 78, and a second input coupled to the positive side of resistor 78, which may also be the 5 volt auxiliary rail 28. The op-amp 80 may convert the small differential voltage create by the sense resistor 78 into a voltage that couples to the multiplexer 54 and correspondingly analog to digital converter 52 (FIG. 3). Thus, the enclosure manager 20 may, in calculating the total power delivered in the enclosure 10, determine the amount of power provided to the five volt auxiliary power rail 28.

By reading the load share voltage for each of the 12 volt, 5 volt and 3 volt power rails, and determining the amount of power delivered to these rails by each of the power supplies, the enclosure manager may determine power delivered. Further, by sensing the voltage across the sense resistor 78 as proportional to the total current delivered to the 5 volt auxiliary rail 28, the enclosure manager may calculate the power delivered from this power rail as well. Combining the various results, the enclosure manager 20 may determine the total power delivered from each of the power supplies in the system. By adding the power that an additional server would utilize (if allowed to power-on), the enclosure manager may determine whether the server would draw too much power to allow the enclosure 10 to operate in a fully redundant mode. If the additional server extends the limits of the power supplies beyond fully redundant operation, the enclosure manager may not allow the server to power-on.

It is noted that in some of the various embodiments described, the load share voltage values may exceed the maximum values which may be applied to the multiplexer 54. In circumstances such as these, it may be possible to lower the voltages by use of voltage divider networks. The voltage divider networks may reside on the enclosure manager circuit board 20, or may likewise reside on the mid-plane board 18 or some other location. To the extent that any of these voltage divider networks induce changes in the sensed voltage from an ideal relationship, such as that illustrated by dashed line 56 in FIG. 4, the enclosure manager 20 may have additional tables, that may operate on the same principles as the table of FIG. 6 and the related exemplary graph of FIG. 5, to aid in removing these deleterious effects.

The above discussion is meant to be illustrative of the principles and various embodiments of the present invention. Numerous variations and modifications will become apparent to those skilled in the art once the above disclosure is fully appreciated. For example, while the bulk of the specification may have been directed to systems with only two power supplies, the principles discussed may likewise be implemented in systems having more than two power supplies. In particular, the system and methods may be operable in an N+1 redundant power system, capable of continuing operation given the failure of any one power supply (where N is the total number of power supplies). In this case, an additional device may be allowed to power-on if the total proposed power is less than or equal to (N−1)/N of the rated power output. The system and methods may likewise be operational in an N+N redundant power system, having multiple fully redundant power grids (as opposed to just power supplies). Further still, the system and methods may be operable in an N+M redundant power system, capable of continuing operation given the failure of M power supplies. In such a circumstance, determining whether an additional device should be powered may be based on a determination of whether the total proposed power is less than or equal to (N−M)/N of the rated power output of the plurality of power supplies individually, where 1<=M<N. Further, while the specification may focus on making a power determination upon insertion of an additional server, the determination regarding available power for an operating condition may be made with respect to any device, such as a server, storage device, packet switching device, and the like. Finally, determining power output using load share signals, and ascertaining whether an additional device should be allowed to power-on as described in the specification may likewise be utilized in a system having only one power supply (or only one operational power supply). It is intended that the following claims be interpreted to embrace all such variations and modifications.

What is claimed is:

1. A method of operating a server system having a server and at least one power supply, the method comprising:
   measuring a voltage level on a load share signal line of the at least one power supply;
   determining an amount of power supplied by the at least one power supply, the determination based on the voltage level; and
   allowing an additional device to power-on if the power required by the additional device in combination with the amount of power supplied by the at least one power supply, is less than or equal to (N−M)/N rated power output of the at least one power supply, where 1<=M<N and N is the number of power supplies.

2. The method as defined in claim 1 wherein determining an amount of power supplied by the at least one power supply further comprises utilizing a table that characterizes the voltage level on the load share line with power output.

3. The method as defined in claim 2 further comprising:
   calculating a power output cf a first power supply by comparing the voltage level on the load share line to a first table, the first table relating the voltage level to the power output of the first power supply;
   calculating a power output of a second power supply by comparing the voltage level to a second table, the second table relating the voltage level to the power output of the second power supply; and
   combining the power outputs of the first and second power supplies.

4. The method as defined in claim 3 wherein the calculating steps further comprise:
   interpolating the power output of the first power supply based on entries in the first table; and
   interpolating the power output of the second power supply based on entries in a second table.

5. The method as defined in claim 3 wherein calculating the power output of the first power supply further comprises calculating a current output for each power rail of the first power supply, the calculation for each rail based on a voltage level on a load sharing signal line for each power rail and a table for each power rail.

6. The method as defined in claim 5 wherein determining the amount of power supplied by the plurality of power supplies further comprises measuring power supplied to a five volt auxiliary power rail.

7. A server system comprising:
   a plurality of servers;
   a plurality of power supplies, each power supply having a power output signal coupled to each of the plurality of servers;

the plurality of power supplies each having a load share signal, the load share signals coupled to each other by way of a load share signal line; and an enclosure manager coupled to the plurality of servers, the plurality of power supplies, and the load share signal line;

wherein the enclosure manager calculates a power delivered by the plurality of power supplies using a voltage level sampled on the load share signal line; and wherein an additional server is not powered-on if the combination of the power delivered and a power required for the additional server exceeds an amount where redundant power operation may be maintained.

8. The server system as defined in claim 7 wherein the plurality of power supplies further comprises a first and second power supply, and wherein the enclosure manager does not power-on the additional server if the combination of the power delivered and the power required for the additional server exceeds an amount of power that may be delivered by the first and second power supplies individually.

9. A server system comprising:
a plurality of servers:
a plurality of power supplies, each power supply having a power output signal coupled to each of the plurality of servers;
the plurality of power supplies each having a load share signal, the load share signals coupled to each other by way of a load share signal line;
an enclosure manager coupled to the plurality of servers, the plurality of power supplies, and the load share signal line; and
wherein the enclosure manager calculates a power delivered by the plurality of power supplies using a voltage level sampled on the load share signal line;
wherein the enclosure manager is further reads a table from each of the plurality of power supplies, the tables relate the voltage level sampled to a power output of each of the power supplies, and wherein the enclosure manager calculates the power delivered by applying the voltage level sampled to each table to obtain a power output for each of the plurality of power supplies, and then adds the power outputs to determine the total power output.

10. The server system as defined in claim 9 wherein each table has at least one variable entry to account for a break paint in a relationship between the voltage level sampled and the power output.

11. A power supply for use with a redundant power supply, the power supply comprising:
a power output signal producing a supplied power to a load;
a load sharing signal, and wherein the load share signal has a voltage thereon used to balance supplied power between the power supply and the redundant power supply;
a memory device;
a communication pathway coupled to the memory device; and
wherein the memory device stores a table that relates the supplied power to the voltage on the load share signal line.

12. The power supply as defined in claim 11 wherein the memory device further comprises a programmable read only memory.

13. The power supply as defined in claim 11 wherein the communication pathway further comprises an I²C bus, and wherein the memory device comprises a serial accessible programmable read only memory.

14. The power supply as defined in claim 11 wherein the table further comprises:
an entry that identifies an offset of the voltage on the load sharing signal when the supplied power is substantially zero; and
an entry that identifies an amount of supplied power when the voltage on the load sharing signal begins to rise above the offset.

15. The power supply as defined in claim 14 wherein the table further comprises entries identifying a voltage on the load sharing signal when the supplied power is substantially at a maximum, and an entry identifying a voltage on the load sharing signal wher the supplied power is substantially half the maximum.

16. A system comprising:
a plurality of server means;
a plurality of power supply means for providing power to the server means, each power supply means having a power output signal coupled to each of the plurality of server means;
the plurality power supply means each having a load share signal, the load share signals coupled to each other by way of a load share signal line, and
a system manager means coupled to the plurality of servers, the plurality of power supplies, and also coupled to the load share signal line, the system manager means for calculating a power delivered by the plurality of power supply means using a voltage level sampled on the load share signal line;
wherein the system manager means does not power-on an additional server means if the combination of the power delivered and a power required for the additional server means exceeds an amount where redundant power operation may be maintained.

17. The server system as defined in claim 16 wherein the plurality of power supply means further comprise a first and second power supply means, and wherein the system manager means does not power-on the additional server means if the combination of the power delivered and the power required for the additional server exceeds an amount of power that may be delivered by the first and second power supplies individually.

18. The server system as defined in claim 16 wherein the system manager means does not power-on an additional server means if the combination of the power delivered and a power required for the additional server means exceeds an amount where M power supplies can fail while power operation may be maintained, whereas 1<=M<N, where N is the total number of power supply means.

19. The server system as defined in claim 16 wherein the system manager means is further adapted for reading a table from each of the plurality of power supply means, the tables relate the voltage level sampled to a power output of each of the power supply means, and wherein the system manager means is further for calculating the power delivered by applying the voltage level sampled to each table to obtain a power output for each of the plurality of power supply means, and adding the power outputs to determine the total power output.

20. The server system as defined in claim 19 wherein each table has at least one variable entry to account for a break point in a relationship between the voltage level sampled and the power output.

* * * * *

UNITED STATES PATENT AND TRADEMARK OFFICE
CERTIFICATE OF CORRECTION

PATENT NO.            : 7,152,174 B2                                          Page 1 of 1
APPLICATION NO. : 10/382456
DATED                   : December 19, 2006
INVENTOR(S)         : David B. Needham et al.

It is certified that error appears in the above-identified patent and that said Letters Patent is hereby corrected as shown below:

On the title page, item (75), in "Inventors", in column 1, line 3, after "Rodgers," delete "Jr.,".

In column 8, line 37, in Claim 3, after "output" delete "cf" and insert -- of --, therefor.

In column 9, line 23, in Claim 9, after "servers" delete ":" and insert -- ; --, therefor.

In column 9, line 36, in Claim 9, after "manager" delete "is".

In column 9, line 47, in Claim 10, delete "paint" and insert -- point --, therefor.

In column 10, line 15, in Claim 15, delete "wher" and insert -- when --, therefor.

In column 10, line 17, in Claim 16, after "A" insert -- server --.

In column 10, line 23, in Claim 16, after "plurality" insert -- of --.

In column 10, line 25, in Claim 16, after "line" delete "," and insert -- ; --, therefor.

Signed and Sealed this

Fourth Day of August, 2009

JOHN DOLL
*Acting Director of the United States Patent and Trademark Office*